(12) United States Patent
Solis

(10) Patent No.: US 9,916,457 B2
(45) Date of Patent: Mar. 13, 2018

(54) DECOUPLED NAME SECURITY BINDING FOR CCN OBJECTS

(71) Applicant: CISCO TECHNOLOGY, INC., San Jose, CA (US)

(72) Inventor: Ignacio Solis, South San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 14/595,052

(22) Filed: Jan. 12, 2015

(65) Prior Publication Data

US 2016/0203322 A1  Jul. 14, 2016

(51) Int. Cl.
  *H04L 9/32* (2006.01)
  *G06F 21/60* (2013.01)
  *H04L 9/08* (2006.01)
  *H04L 29/06* (2006.01)
  *G06F 21/64* (2013.01)

(52) U.S. Cl.
  CPC ............ *G06F 21/602* (2013.01); *G06F 21/64* (2013.01); *H04L 9/0816* (2013.01); *H04L 9/3247* (2013.01); *H04L 63/12* (2013.01); *H04L 2209/60* (2013.01)

(58) Field of Classification Search
  CPC ....................... H04L 9/3242; H04L 2209/24
  USPC ......................................................... 713/189
  See application file for complete search history.

(56) References Cited

U.S. PATENT DOCUMENTS

| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |

(Continued)

FOREIGN PATENT DOCUMENTS

| CN | 103873371 | 6/2014 |
| DE | 1720277 A1 | 6/1967 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Haresh N Patel

(57) ABSTRACT

A data-hosting system facilitates binding a decoupled name to a data object. During operation, the system can receive a command to generate a decoupled name that binds a new name to the data object. The system generates a hash for the data object based on the data object's content, such that the hash is not generated based on a name for the data object. The system then obtains a private key for signing the data object, and generates the decoupled name for the data object by encrypting the data object's hash and the new name using the private key. This decoupled name binds the new name to the data object. When a client request the data object based on the network name, the system can return the decoupled name associated with content of the data object. The client can use the decoupled name to validate the data object.

18 Claims, 9 Drawing Sheets

(56) References Cited

U.S. PATENT DOCUMENTS

| | | |
|---|---|---|
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |

(56) References Cited

U.S. PATENT DOCUMENTS

| | | |
|---|---|---|
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |

(56) References Cited

U.S. PATENT DOCUMENTS

| | | |
|---|---|---|
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1* | 2/2012 | Rembarz ............... H04L 9/0822 380/281 |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |

(56) References Cited

U.S. PATENT DOCUMENTS

| | | |
|---|---|---|
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1* | 10/2015 | Mosko ............. H04L 67/1095 709/248 |
| 2015/0312300 A1* | 10/2015 | Mosko ............... H04L 63/164 713/171 |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1* | 1/2016 | Mosko ............. G06F 17/30575 707/610 |
| 2016/0021172 A1* | 1/2016 | Mahadevan ...... G06F 17/30598 709/204 |
| 2016/0062840 A1* | 3/2016 | Scott ...................... G06F 9/46 707/684 |
| 2016/0110466 A1* | 4/2016 | Uzun ............... G06F 17/30876 707/751 |
| 2016/0134915 A1* | 5/2016 | Oran .................. H04N 21/2662 725/95 |
| 2016/0149978 A1* | 5/2016 | Wissingh ........... H04L 65/4069 709/231 |
| 2016/0171184 A1* | 6/2016 | Solis ...................... G06F 21/10 726/19 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011049890 A1 | 4/2011 |

(56) References Cited

FOREIGN PATENT DOCUMENTS

| WO | 2012077073 A1 | 6/2012 |
|---|---|---|
| WO | 2013123410 | 8/2013 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

A. Broder and A. Karlin, "Multilevel Adaptive Hashing", Jan. 1990, pp. 43-53.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

B. Ahlgren et al., 'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Cho, Jin-Hee, Ananthram Swami, and Ray Chen. "A survey on trust management for mobile ad hoc networks." Communications Surveys & Tutorials, IEEE 13.4 (2011): 562-583.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

Jacobson et al., "Custodian-Based Information Sharing," Jul. 2012, IEEE Communications Magazine: vol. 50 Issue 7 (p. 3843).

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Lopez, Javier, et al. "Trust management systems for wireless sensor networks: Best practices." Computer Communications 33.9 (2010): 1086-1093.

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Walfish, H. Balakrishnan, and S. Shenker, "Untangling the web from DNS," in Proc. USENIX NSDI 2004, Oct. 2010, pp. 735-737.

Matocha, Jeff, and Tracy Camp. 'A taxonomy of distributed termination detection algorithms.' Journal of Systems and Software 43.3 (1998): 207-221.

Merindol et al., "An efficient algorithm to enable path diversity in link state routing networks", Jan. 10, Computer Networks 55 (2011), pp. 1132-1140.

Narasimhan, Sriram, and Lee Brownston. "HyDE—A General Framework for Stochastic and Hybrid Modelbased Diagnosis." Proc. DX 7 (2007): 162-169.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

Rosenberg, J. "Interactive Connectivity Establishment (ICE): A Protocol for Network Address Translator (NAT) Traversal for Offer/Answer Protocols", Apr. 2010, pp. 1-117.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

(56) References Cited

OTHER PUBLICATIONS

Shani, Guy, Joelle Pineau, and Robert Kaplow. "A survey of point-based POMDP solvers." Autonomous Agents and Multi-Agent Systems 27.1 (2013): 1-51.

Shih, Eugene et al., 'Wake on Wireless: An Event Driven Energy Saving Strategy for Battery Operated Devices', Sep. 23, 2002, pp. 160-171.

Shneyderman, Alex et al., 'Mobile VPN: Delivering Advanced Services in Next Generation Wireless Systems', Jan. 1, 2003, pp. 3-29.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Wang, Jiangzhe et al.,"DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, Lixia, et al. 'Named data networking.' ACM SIGCOMM Computer Communication Review 44.3 {2014): 66-73.

D. Trossen and G. Parisis, "Designing and realizing and information-centric internet," IEEE Communications Magazing, vol. 50, No. 7, pp. 60-67, Jul. 2012.

Gasti, Paolo et al., 'DoS & DDoS in Named Data Networking', 2013 22nd International Conference on Computer Communications and Networks (ICCCN), Aug. 2013, pp. 1-7.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure1*.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.

Sun et al.: "Content-Based Route Lookup Using CAMs", Global Communications Conference, IEEE, Dec. 3, 2012 *The Whole Document*.

* cited by examiner

DECOUPLED NAME SECURITY BINDING FOR CCN OBJECTS

BACKGROUND

Field

This disclosure is generally related to Content Centric Networking. More specifically, this disclosure is related to binding a name to a data object.

Related Art

In a typical Content Centric Networking (CCN) architecture, a Content Object has a name, and a content. Whenever a hash is created for the Content Object, the hash is generated based on the Content Object's content, as well as its name. Then, when a publisher signs a Content Object, the publisher generates the signature by encrypting the hash that binds of the Content Object's name and the content. Hence, the signature in the Content Object binds the Content Object's name to its content.

Also, some Content Objects can be requested based on their hash value. For example, a typical Manifest for a data collection can include a hash for a plurality of Content Object's in the data collection, and can include a signature for each of these hash values. An entity that obtains the Manifest can use the hash values in the Manifest to request the individual Content Objects listed in the Manifest. However, even though the Content Object can be requested by its hash value, the Content Object is still tied to a specific name because the hash was generated in part based on this network name.

These hash values make it difficult to bind other names to a Content Object without conflicting with the Content Object's signature or it's hash value. Assigning a new name to an existing Content Object in the typical CCN architecture requires creating a new Content Object that binds the new name to a copy of the existing Content Object's data. It is not currently possible for one piece of content to be assigned multiple signed names.

SUMMARY

One embodiment provides a data-hosting system that facilitates binding a decoupled name to a data object. This decoupled name includes a name for the data object, and includes a signature that binds the name to the data object's hash value. During operation, the system can receive a command to generate a decoupled name for a data object. The command can include a new name to bind to the data object. The system generates a hash for the data object based on the data object's content, such that the hash is not generated based on a name for the data object. The system then obtains a private key for signing the data object, and generates the decoupled name for the data object by encrypting the data object's hash and the new name using the private key.

In some embodiments, the data object includes a Content Centric Networking (CCN) Content Object or an Information Centric Networking (ICN) Content Object.

In Information Centric Networks, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in an CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, the system can receive a request to access the data object, such that the request includes a network name for the content. The system selects the data object based on the network name for the content, and selects the decoupled name based on the hash for the content. The system then returns at least the decoupled name to the entity which requested the data object.

In some variations to these embodiments, while returning at least the decoupled name, the system returns the data object and the decoupled name as separate objects.

In some variations to these embodiments, while returning at least the decoupled name, the system can create a new data object that includes the original data object's contents and also includes the decoupled name, and returns the new data object that includes the decoupled name.

In some variations to these embodiments, while returning at least the decoupled name, the system generates a Manifest that includes the decoupled name, and returns the Manifest.

In some variations to these embodiments, the data object request can include an Interest message which includes the network name or the new name for the data object.

One embodiment provides a client device that can validate a data object based on a decoupled name received for the data object. During operation, the client can request a data object based on a network name for the data object. In response to sending the request, the client can receive a decoupled name associated with content of the data object. The decoupled name includes a second name different than the network name for the data object, and includes a signature generated based on a hash value of the data object's content and the second name. The client then validates the decoupled name.

In some embodiments, while receiving the decoupled name, the client can receive a respective decoupled name as a separate data object from the data object.

In some embodiments, while receiving the decoupled name, the client can receive a respective decoupled name embedded in the data object.

In some embodiments, while receiving the decoupled name, the client can receive a Manifest which includes the at least one decoupled name.

In some variations to these embodiments, the client obtains an object hash value from a decoupled name in the Manifest, and disseminates an Interest for a data object identified by the object hash value. Then, responsive to disseminating the Interest, the client can obtain a nameless data object whose hash value matches the decoupled name's object hash value.

BRIEF DESCRIPTION OF THE FIGURES

In the figures, like reference numerals refer to the same figure elements.

DETAILED DESCRIPTION

Figure 1:
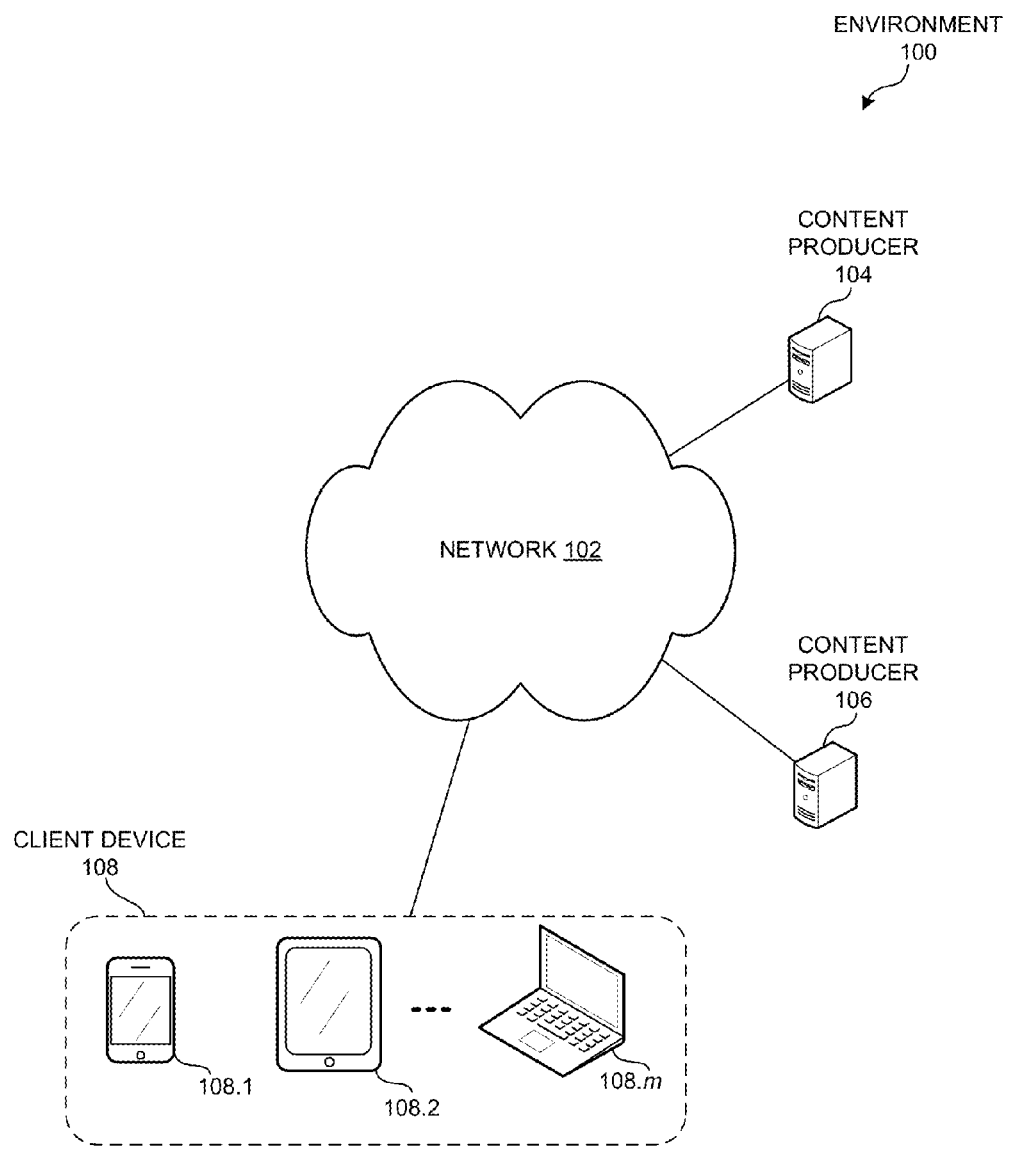
FIG. 1 illustrates an exemplary network environment that facilitates assigning a decoupled name to a data object in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a content management system that solves the problem of binding multiple names to a data object. For example, an entity such as a user or an online service may need a piece of content to have multiple names, perhaps to allow the content to be accessible via any of its multiple names, or to allow different entities to sign and name the same piece of content.

To achieve this, the entity generates a hash for a piece of content based on the content itself, and not based on a name for the content. This entity can cryptographically bind a name to the content by using its private key to generate a signature based on their name for the content and the content's hash. In some embodiments, this entity can generate the signature using the same hash they used to access the content (e.g., when accessing a nameless object); they don't need to recomputed the hash for the content.

Other entities can also generate their own decoupled names for the content by using their own private keys to generate a signature that cryptographically binds a different name to the content's hash. Hence, the content can have a signature for each name that is cryptographically bound to the content, regardless of which entity is binding (e.g., signing) the name and hash.

In some embodiments, a content producer can process a request's network name to determine which data objects to return to a client, regardless of which names are used to store the data objects. For example, the content producer may be a bank that stores a client's statements under the name prefix "/bank/statements/Ignacio/statement_date," where "statement date" specifies a month and year for a statement. The client can request his latest statement by disseminating a request or Interest for the name prefix "/bank/Ignacio/recent_statement." The bank can determine the type of information the user is requesting based on the request's name elements, and searches for the most recent statement to return to the client, even though the statement's name does not match the request's network name.

Once the content producer selects the data object to return for the request, the content producer can create a return object with a name that includes the request's name, and with a payload that includes the requested data object and one or more decoupled names that each cryptographically binds a name to the data object. This makes it possible for the content producer to sign the data object based on the unique identifier it uses to store the data object. The client can use a decoupled name's signature to validate the data object, even though the client's request included a different network name.

In contrast, a traditional CCN architecture uses a Content Object's name to forward the Content Object, and to match the Content Object to an Interest. Hence, the Content Object's name is used by the network's forwarders, by the application that generates the Content Object, by the application that is requesting the Content Object, and by security agents that validate the Content Object. This makes it impossible for the traditional CCN architecture to allow a data object to be accessed, forwarded, or validated using any of a multiple names that are cryptographically bound to the data object.

Exemplary Network Environment

FIG. 1 illustrates an exemplary network environment 100 that facilitates assigning a decoupled name to a data object in accordance with an embodiment. Computing environment 100 can include a computer network 102, which can include any wired or wireless network that interfaces various computing devices to each other, such as a computer network implemented via one or more technologies (e.g., Bluetooth, Wi-Fi, cellular, Ethernet, fiber-optic, etc.). Network 102 can include a Content Centric Network. In some embodiments, network 102 can include the Internet.

Computing environment 100 can also include a client device 108, which can include any computing device that can disseminate Interests and receive Content Objects via network 102. For example, client device 108 can include a smartphone 108.1, a tablet computer 108.2, and/or a personal computing device 108.m (e.g., a laptop). Specifically, client device 108 can disseminate an Interest that can disseminate Interests across network 102 to obtain data objects.

In some embodiments, computing environment 100 can include a content producer 104 that can host data or services for one or more client devices. For example, content producer 104 can receive and process a request or Interests from client device 108. When content producer 104 receives the request, content producer 104 can select a piece of data based on the request's name and/or search criteria, regardless of the name used to store the selected piece of data. Content producer can use a decoupled name to bind the data's local name to the data, and to sign the data and its local name for the data.

Recall that in a typical CCN architecture, a Content Object being returned over a network needs to have a name or name prefix that matches that of an Interest which requested the Content Object. In some embodiments, it's possible for network 102 to use one name for forwarding data, and for applications or client devices to use a different name (e.g., a decoupled name) to request the content and verify it's authenticity.

Hence, content producer 104 can return the data to client device 108 by generating a Content Object that includes the network name from the client's request for the data (e.g., an Interest name), and whose payload includes the piece of data and the decoupled name. The routers along a return path over the CCN can use the Content Object's network name to return the Content Object to client device 108, and client device 108 can use the decoupled name to validate the Content Object's data.

For example, an application on client device 108 can generate an Interest that requests a piece of data, such as an Interest with the name "/PARC/ccn.doc" to request ccn.doc from the "/PARC" domain. Client device 108 then disseminates the Interest across network 102, which is then forwarded toward content producer 104 that can satisfy the Interest "/PARC/ccn.doc." The content producer 104 then uses the name "/PARC/ccn.doc" to determine which local data can be used to satisfy the Interest, and generates a Content Object that includes the Interest's name, and includes the document "ccn.doc" in the payload.

Note that when content producer 104 searches for the data to return, content producer is not limited to searching for existing data that matches the name prefix "/PARC" or "/PARC/ccn.doc." In some embodiments, content producer can obtain a document "/PARC_Storage/ccn_v5.doc" that is known to be associated with "ccn.doc," and generates a Content Object that includes "ccn_v5.doc." Content producer can sign the document "ccn_v5.doc" by generating a signed decoupled name that binds any name to the document, and generates the Content Object to include this decoupled name. The name in the decoupled name can include, for example, the network name "/PARC/ccn.doc," the storage name "/PARC_Storage/ccn_v5.doc," or any other name which content producer 104 uses to sign the document.

In some embodiments, another content producer 106 can also generate a decoupled name for the piece of data hosted by content producer 104, even though content producer 106 does not host or did not generate the piece of data. For example, client device 108 can send a request to a trusted entity (e.g., content producer 106) to obtain a signed name for the data. This request can identify the data using an object hash of the data (and not of the data's name). The trusted entity can process this request by looking up a signed name prefix associated with this object hash, and returns this decoupled name to client device 108. The decoupled name includes the data's object hash value, a name which the trusted entity uses for the data, and the signature which binds the name to the data's object hash value.

In some embodiments, using decoupled names allows content producer 104 to move or copy the content to a new location, and to assign a new name to the content, such as a name associated with the new location. For example, if content producer 104 moves the document "ccn.doc" to a server on the domain "/PARC/CSL," it's possible for the same Content Object to satisfy a request for "/PARC/CSL/ccn.doc," even though the Content Object is cryptographically bound to the name "/PARC/ccn.doc." The Content Object has the name "/PARC/CSL/ccn.doc," but has a cryptographic signature that binds the Content Object's content to "/PARC/ccn.doc." Thus, the Content Object can now have a network name, and can have a signed name that is different than the network name.

As another example, if content producer 104 corresponds to a bank's server that hosts banking statements, client device 108 can retrieve a bank statement by disseminating an Interest for the statement to content producer 104. Content producer 104 can use any criteria to select the matching content to return to client device 108; the data being returned does not need to match the name or name prefix of the CCN Interest. A user may disseminate an Interest that includes a query: "/bank/ignacio/statement/?month=oct&balance<10000." Content producer 104 can process the query to search through the user's bank statements for any statement that matches the search criteria, even though the signed name may not satisfy the Interest. Once content producer 104 finds a matching piece of data, content producer 104 generates and returns a Content Object that includes the Interest's name, and that includes the matching data and a corresponding decoupled name for the data in the Content Object's payload.

Figure 2:
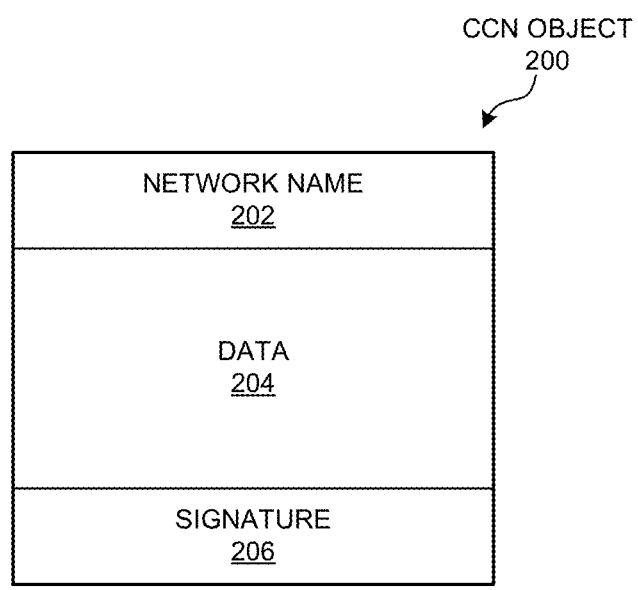
FIG. 2 illustrates a typical Content Centric Networking Content Object in accordance with an embodiment.

FIG. 2 illustrates a typical Content Centric Networking Content Object 200 in accordance with an embodiment. Specifically, Content Object 200 includes a network name 202, data 204, and a signature which is generated based on a hash of network name 202 and data 204.

Figure 3A:
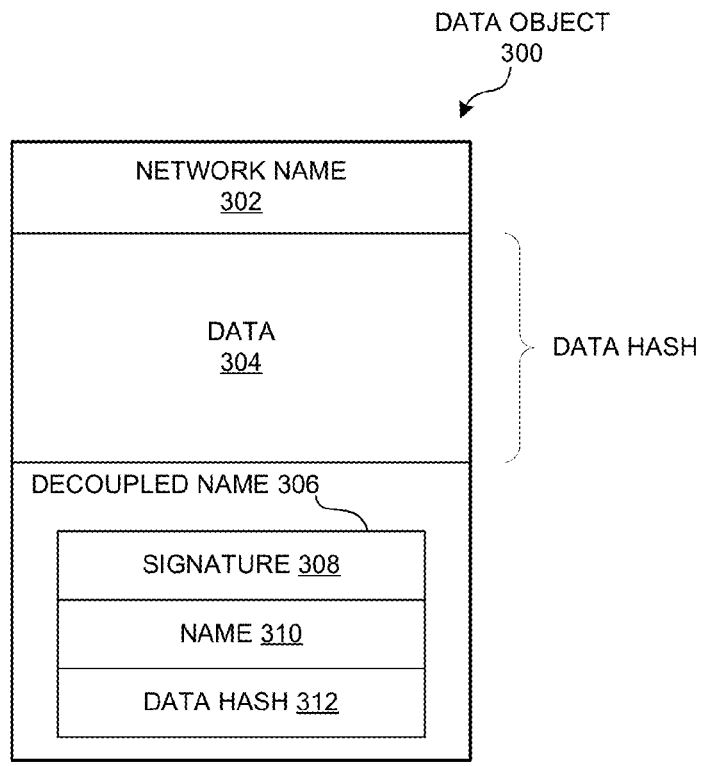
FIG. 3A illustrates a data object which includes a decoupled name in accordance with an embodiment.

FIG. 3A illustrates a data object 300 which includes a decoupled name in accordance with an embodiment. Specifically, data object 300 includes a network name 302, data 304, and a decoupled name 306. Decoupled name 306 includes a name 310, a data hash 312 computed from data 304, and a signature 308 which is generated based on data hash 312. Neither data hash 312 nor signature 308 are generated based on network name 302 or name 310.

In some embodiments, network name 302 can include, for example, a name which was used by a client device to access data 304. Name 310, on the other hand, can include a name that is permanently bound to data 304, and which is signed by the entity which generated decoupled name 306. If multiple entities have bound a decoupled name to data 304, content producer can generate data object 300 to include multiple decoupled names.

In some embodiments, a Content Object can be a nameless object which does not include a network name for the data. However, the data can still be self-certifying by including a signed decoupled name which is signed by a trusted entity (e.g., a content producer or host for the data) and bound to the nameless object.

Figure 3B:
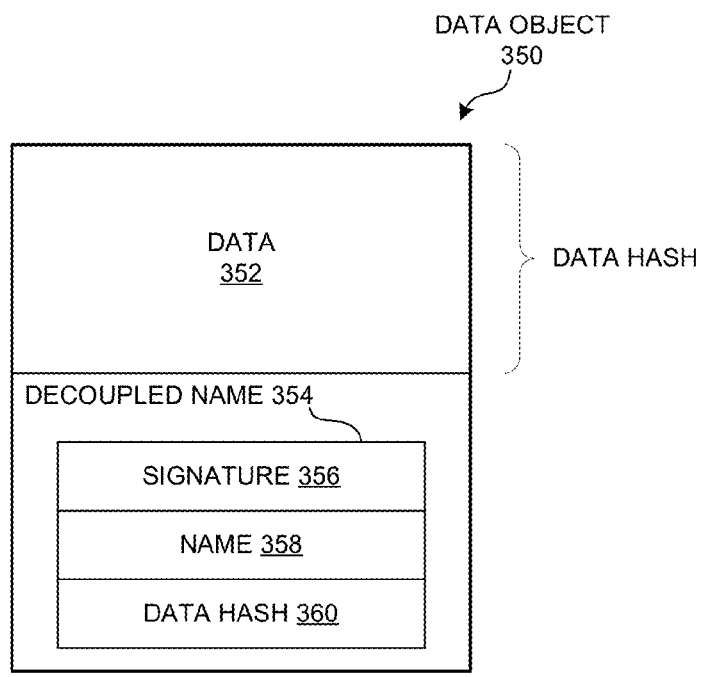
FIG. 3B illustrates a nameless data object which includes a decoupled name in accordance with an embodiment.

FIG. 3B illustrates a nameless data object 350 which includes a decoupled name in accordance with an embodiment. Specifically, data object 350 includes data 352 and a decoupled name 354. Decoupled name 354 includes a name 358, a data hash 360 computed from data 356, and a signature 356 which is generated based on data hash 360. Neither data hash 360 nor signature 356 are generated based on name 358.

Figure 4:
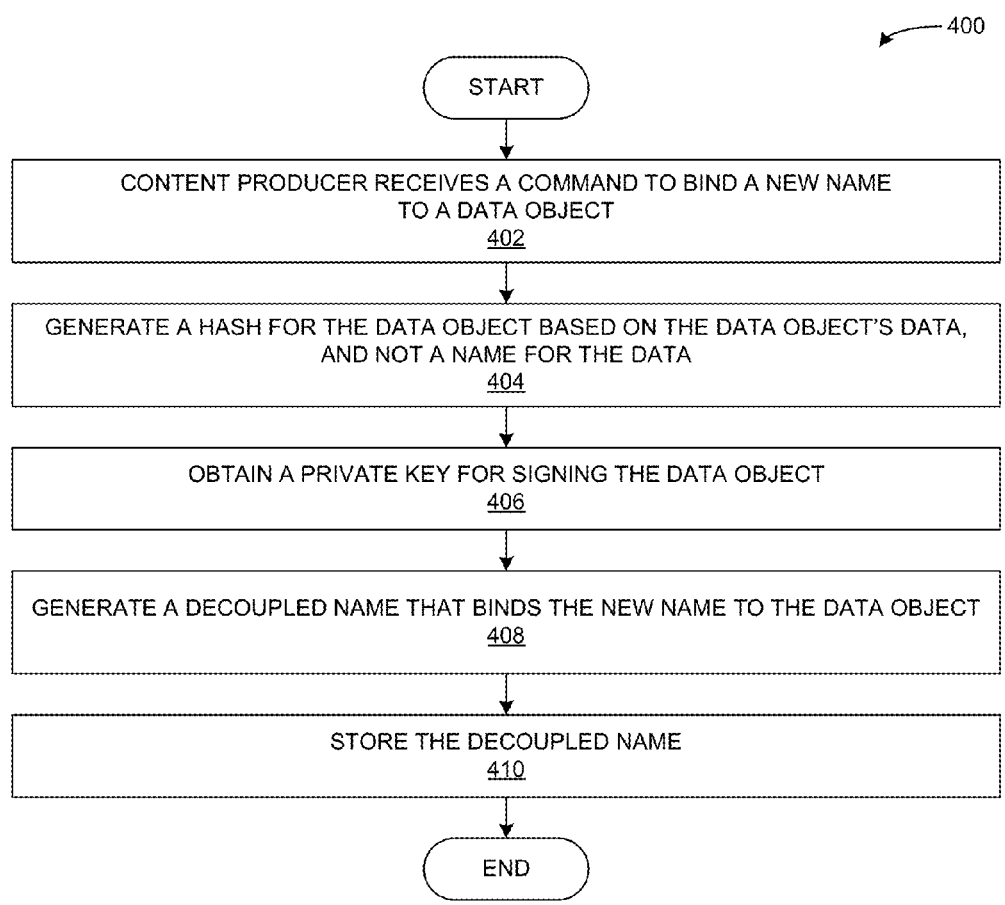
FIG. 4 presents a flow chart illustrating a method for generating a decoupled name for a data object in accordance with an embodiment.

FIG. 4 presents a flow chart illustrating a method 400 for generating a decoupled name for a data object in accordance with an embodiment. During operation, a content producer can receive a command to bind a new name to a data object (operation 402). To process the request, the content producer generates a hash for the data object based on the data object's content, and not based on a name for the data (operation 404). Note that generating the hash based on the data object's content allows the content producer to cryptographically bind new names to the content, regardless of the name currently being used to store the content.

The content producer can generate this cryptographic binding by obtaining a private key for signing the data object (operation 406), and encrypts the new name and the data object's hash using the private key to bind the new name to the data object's content (operation 408). The content producer the stores the decoupled name (operation 410).

Returning Data Objects with Decoupled Names

In some embodiments, a client can receive a decoupled name implicitly, for example, when the client receives a data object that includes one or more decoupled names as illustrated in FIG. 3. Alternatively, the client can receive a data object and any associated decoupled names as separate objects, each accessed via its own network name. For example, after processing a request from a client, a content producer can return a data object that includes a pointer (e.g., network names) to the signed decoupled name. The client can obtain the signed decoupled name using the pointer, and can use the signed decoupled name to validate the data object.

Figure 5:
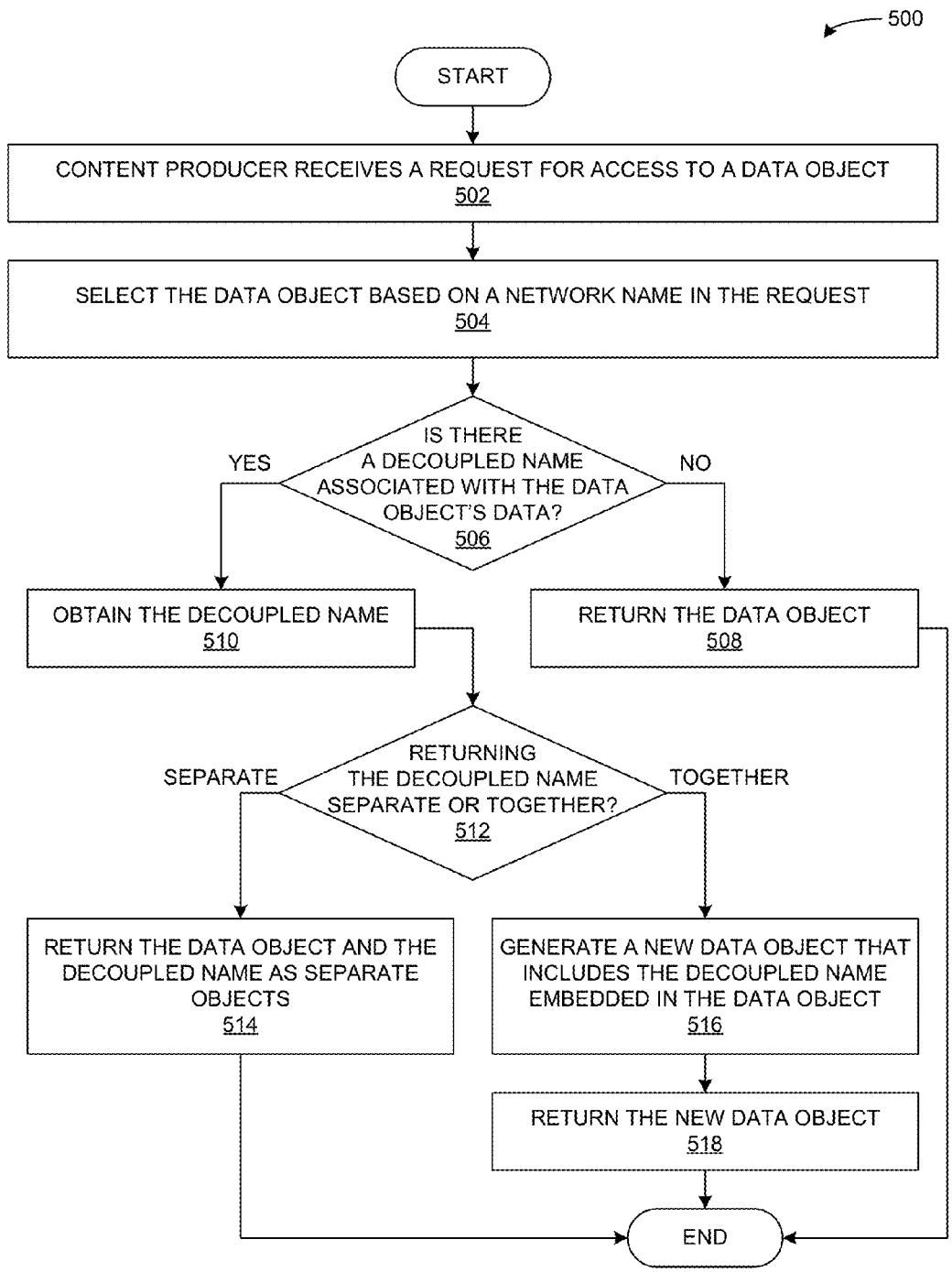
FIG. 5 presents a flow chart illustrating a method for responding to a request for a data object which may be associated with one or more decoupled name in accordance with an embodiment.

FIG. 5 presents a flow chart illustrating a method 500 for responding to a request for a data object which may be associated with one or more decoupled name in accordance with an embodiment. During operation, the content producer receives a request for access to a data object (operation 502). This request can include a network name which uniquely identifies the data object, such as a CCN name (e.g., an HSVLI) for the data object. The content producer then selects the data object from a data repository based on the network name (operation 504), and determines whether a decoupled name exists that is associated with the data object's contents (operation 506). If a decoupled name does not exist, the content producer returns the data object alone to satisfy the request (operation 508).

However, if a decoupled name does exist for the data object, the content producer obtains the decoupled name from a storage repository (operation 510), and returns the data object and the decoupled name to the client device to satisfy the request. For example, the content producer can determine whether it needs to return the decoupled name together or separate from the data object (operation 512). The content producer can determine how it needs to return the decoupled name based on a configuration pre-set by an administrator, or based on an instruction in the request.

If the content producer is to return the decoupled name separately, the content producer proceeds to return the data object and the decoupled name as separate data objects (operation 514). Otherwise, if the content producer is to return the data object and the decoupled names together, the content producer can generate a new data object that includes the decoupled name embedded in the data object (operation 516), and returns the new data object (operation 518).

In some embodiments, a client can receive a data object for a piece of content and any associated decoupled names as separate objects, each accessed via its own network name. This allows the content and its decoupled names to be stored separately, and to hosted and served by different entities.

Figure 6:
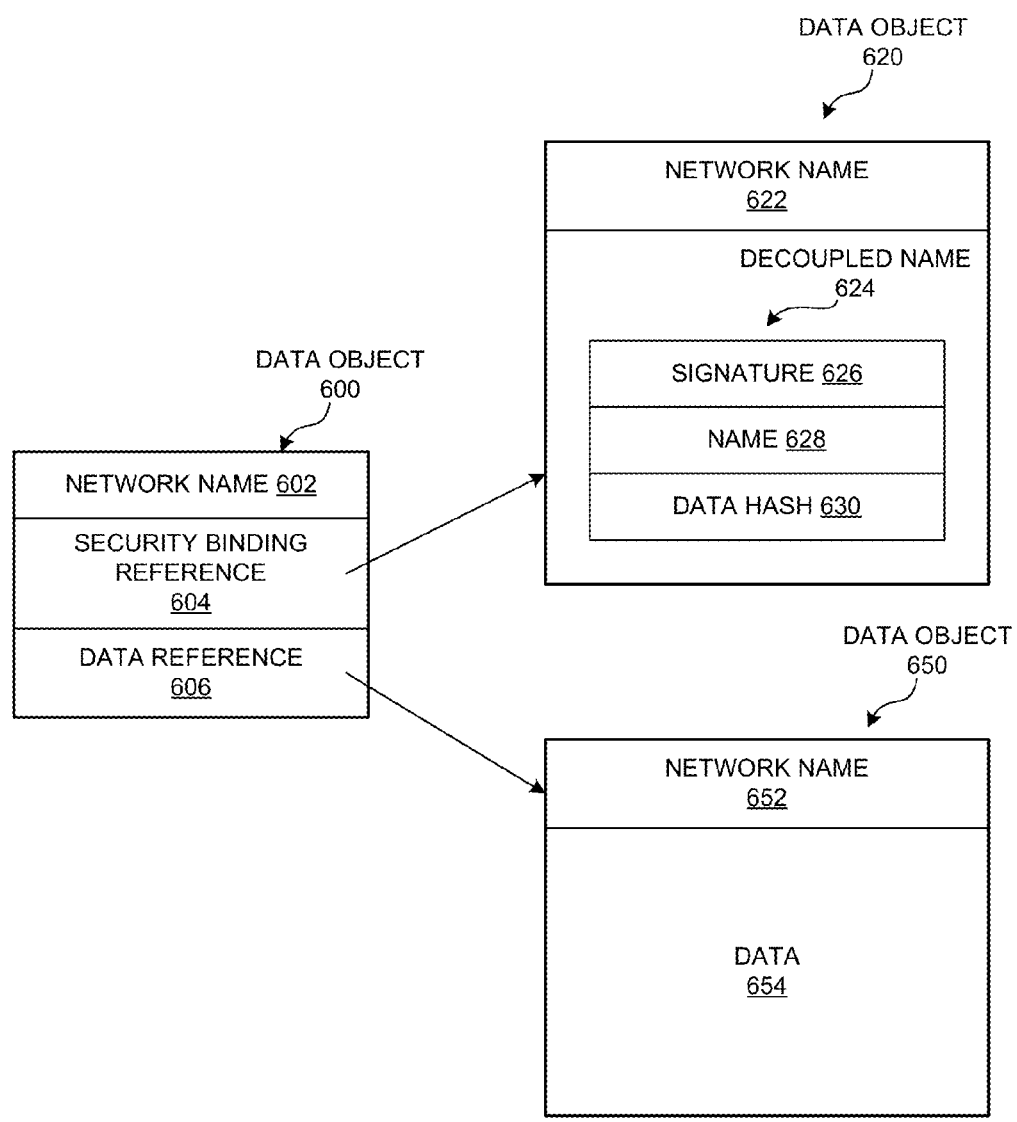
FIG. 6 illustrates a decoupled name which is returned separate from its associated data object in accordance with an embodiment.

FIG. 6 illustrates a decoupled name 624 which is returned separate from its associated data object 650 in accordance with an embodiment. For example, after processing a request form the client, a content producer can return a data object 600 that includes two references (e.g., network names): a security binding reference 604 that includes a network name 622 for the signed decoupled name 624; and a data reference that includes a network name 652 for the piece of data 654 (e.g., a Content Object with the data, which may not itself include a signature for the data). If the data is stored as a nameless object, data reference 606 can include a hash value for data 654. The client can then use reference 604 to request a data object 620 that includes signed decoupled name 624, and uses reference 606 to request a data object 650 that includes data 654. The client then receives decoupled name 624 and data 654 via separate data objects.

Figure 7:
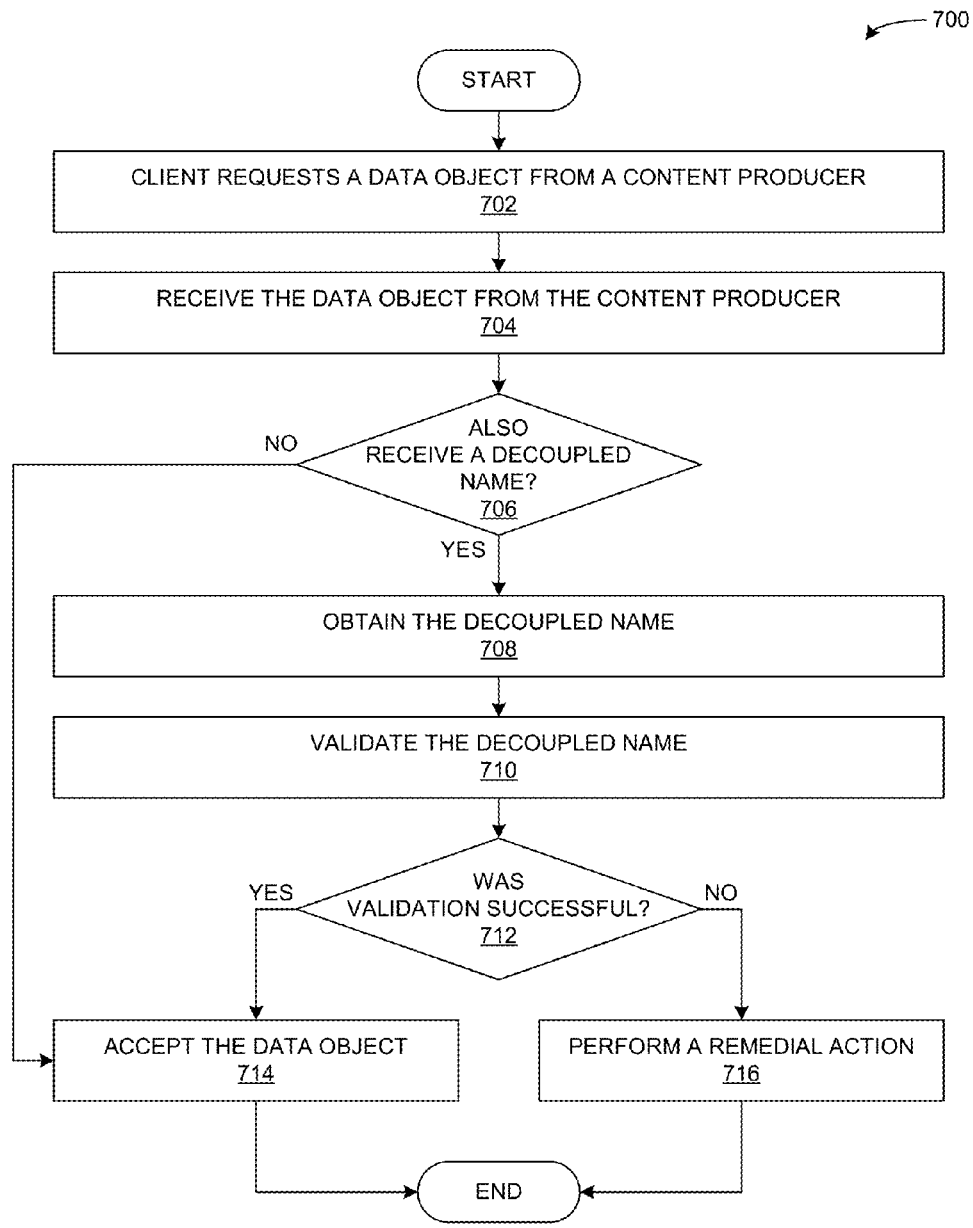
FIG. 7 presents a flow chart illustrating a method for requesting a data object which may be associated with one or more decoupled names in accordance with an embodiment.

FIG. 7 presents a flow chart illustrating a method 700 for requesting a data object which may be associated with one or more decoupled names in accordance with an embodiment. During operation, a client can request a data object from a content producer (operation 702). When the client receives a response that includes the data object (operation 704), the client can analyze the response to determine whether the response also includes or references a decoupled name (operation 706).

If so, the client device can obtain the decoupled name (operation 708). For example, the client device can obtain the decoupled name directly from the response received from the content producer. Alternatively, the client can obtain a reference to the decoupled name from the response, and can issue a separate request to receive the decoupled name for the requested data object in a separate data object. The client then validates the decoupled name (operation 710). If the decoupled name is valid, the client can accept the data object (operation 712). However, if validation was not successful, the client may perform a remedial action (operation 714), such as to reject the data object, prompt the user to decide whether to accept the data object, or perform another remedial action.

Manifests with Decoupled Names

A publisher can host a collection of nameless Content Objects across various replica servers or hosting servers. These nameless Content Objects are truly placeless objects, as they do not include a name, and thus don't have an implied routing. The publisher can create a Manifest (or a hierarchy of Manifests) for a nameless Content Object or a collection of nameless Content Objects. This allows the publisher to provide the Manifest (or a root Manifest of a Manifest hierarchy) to a client that requests these Content Objects so that the client can generate Interests to request the nameless Content Objects. A description of a Manifest is described in U.S. patent application Ser. No. 14/337,026, entitled "SYSTEM FOR DISTRIBUTING NAMELESS OBJECTS USING SELF-CERTIFYING NAMES," by inventor Marc Mosko, filed 21 Jul. 2014), which is hereby incorporated by reference.

The Manifest (or root Manifest) can include Content Object hash (COH) values that can be used to uniquely identify nameless Content Objects or other non-root Manifests. The Manifest also includes a network name or name prefix for a server that hosts the Manifest, and that may also host the nameless Content Objects.

In some embodiments, a Manifest can include decoupled names to one or more data objects. For example, the Manifest can point to other Manifests or content (e.g., Content Objects) by their hash value, regardless of their name. The content can be a data object produced by a content producer, such as a picture taken by a user's mobile phone. The mobile phone can compute a hash of the data object, and can create a decoupled name that is cryptographically binds the name to the data object's hash, and can create a Manifest that includes this decoupled name. This Manifest can be stored across any namespace or name prefix, such as a name prefix for the user's mobile phone, for his personal computer, for an online storage repository (e.g., Dropbox), or for an online service (e.g., an online social network).

A data consumer can obtain the data object by first obtaining the Manifest from any of the namespaces that can provide the Manifest. For example, the data object can be for a picture which the user's mobile phone named "/isolis/pictures/101.jpg." If the user shared the picture via an online service (e.g., the photo hosting service Flickr by Yahoo! Inc.), the online service can return a Manifest that includes a decoupled name that binds the picture's name and signature to a COH for the picture. When the data consumer receives the Manifest, the consumer can use the decoupled name to obtain the COH for the picture, as well as to determine a name binding for the picture.

In some embodiments, the Manifest can be signed by the online service that is hosting the Manifest, for example, by including a decoupled name bound to the Manifest's COH. Also, the decoupled name for the picture may have been generated by the user's mobile phone. Hence, when the data consumer receives the Manifest, the consumer can use the Manifest's signature to verify that the Manifest indeed originated from the online service, and can use the picture's decoupled name in the Manifest to verify the authenticity of the object itself (e.g., to verify that the picture itself originated from the user's mobile phone). Hence, the decoupled name can be used to validate the picture, regardless of which entity provided the Manifest, and regardless of where the picture is hosted or from which namespace the picture is received.

In some embodiments, a data object may have multiple names that are cryptographically bound to the data object, by different entities. For example, if the data object is a picture that includes multiple people, each person in the picture can generate a separate decoupled name for the picture, which is signed using that person's private key. Other users can use the COH to obtain the picture, and can use a decoupled name from a person in the picture to validate the picture (e.g., to verify that this person is indeed in the picture).

These decoupled name objects can be stored and disseminated separately (e.g., as their own objects), in a Manifest (which can include decoupled names for different objects or the same object), or embedded in the object they're naming. For example, a picture hosting service can allow various users to "tag" themselves in the picture. Then, when a user views or downloads the picture, the hosting service can return a picture object that includes the separate decoupled name objects from each person in the picture that has digitally signed the picture. Alternatively, the online service can generate a Manifest that includes these separate decoupled name objects from each person in the picture.

Figure 8:
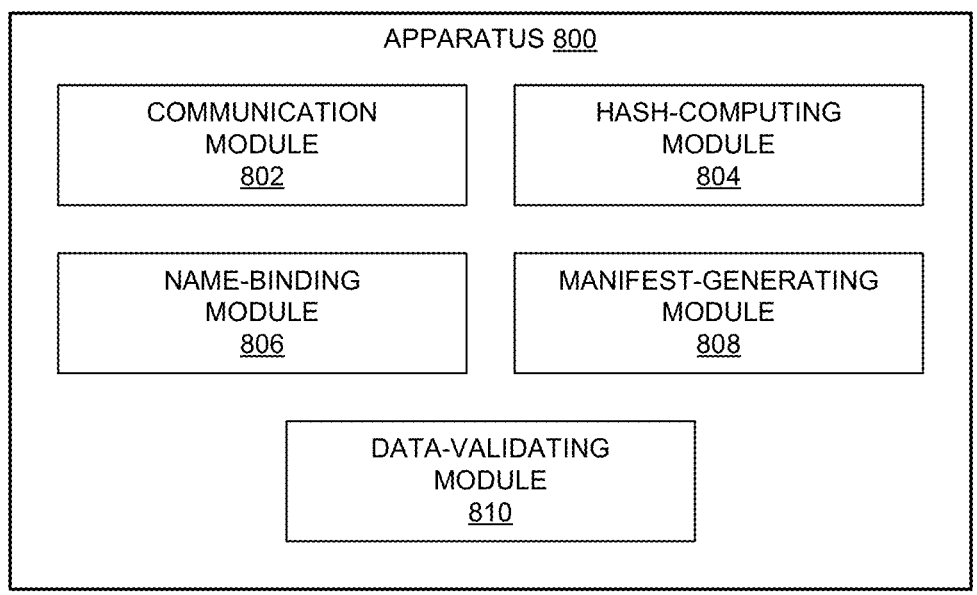
FIG. 8 illustrates an exemplary apparatus that facilitates assigning a decoupled name to a data object in accordance with an embodiment.

FIG. 8 illustrates an exemplary apparatus 800 that facilitates assigning a decoupled name to a data object in accordance with an embodiment. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a communication module 802, a hash-computing module 804, a name-binding module 806, a manifest-generating module 808, and a data-validating module 810.

In some embodiments, communication module 802 can send a decoupled name for a data object to a client, and/or can receive a decoupled name from a content producer. Hash-computing module 804 can compute a hash for the data object's contents without accounting for the data object's name. Name-binding module 806 can bind a name to the data object by using a publisher's key to sign the name and the hash for the data object. Manifest-generating module 808 can generate a Manifest which includes one or more decoupled names associated with one or more data objects in a collection of objects. Data-validating module 810 can validate a data object by validating a signature in a decoupled name for the data object.

Figure 9:
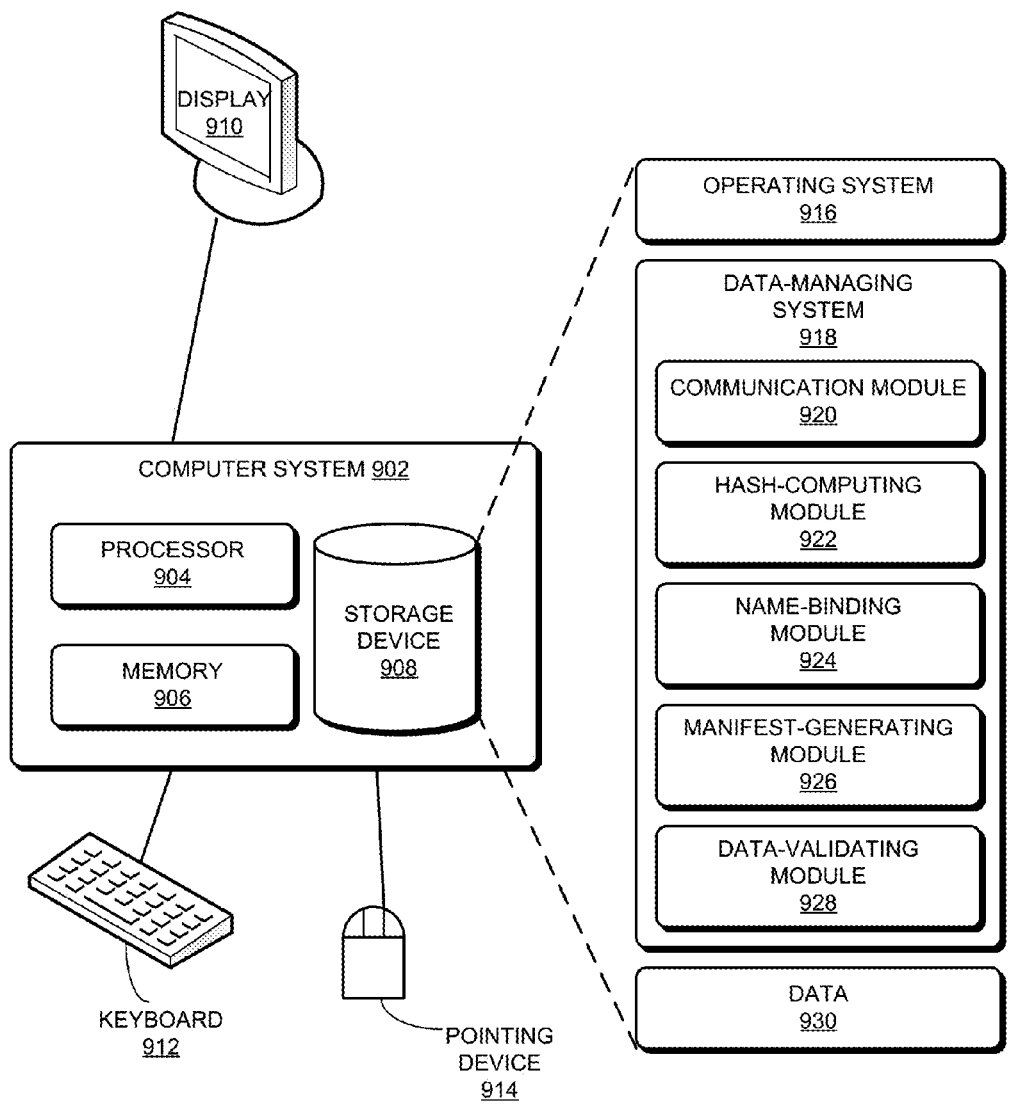
FIG. 9 illustrates an exemplary computer system that facilitates assigning a decoupled name to a data object in accordance with an embodiment.

FIG. 9 illustrates an exemplary computer system 902 that facilitates assigning a decoupled name to a data object in accordance with an embodiment. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store operating system 916, a data-managing system 918, and data 926.

Data-managing system 918 can include instructions, which when executed by computer system 902, can cause computer system 902 to perform methods and/or processes described in this disclosure. Specifically, data-managing system 918 may include instructions for sending a decoupled name for a data object to a client, and/or can receiving a decoupled name from a content producer (communication module 920). Further, data-managing system 918 can include instructions for computing a hash for the data object's contents without accounting for the data object's name (hash-computing module 922). Data-managing system 918 can also include instructions for binding a name to the data object by using a publisher's key to sign the name and the hash for the data object (name-binding module 924).

Data-managing system 918 can include instructions for generating a Manifest which includes one or more decoupled names associated with one or more data objects in a collection of objects (manifest-generating module 922). Data-managing system 918 can also include instructions for validating a data object by validating a signature in a decoupled name for the data object (data-validating module 924).

Data 926 can include any data that is required as input or that is generated as output by the methods and/or processes described in this disclosure. Specifically, data 926 can store at least a collection of data objects, and a set of decoupled names for the data objects.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
responsive to receiving, by a computing device, a command to generate a decoupled name for a data object having content and a network name, wherein the command includes a new name to bind to the data object:
generating a hash for the data object based on the content, but not based on either of the name or the new name;
obtaining a private key for signing the data object; and
encrypting the hash using the private key to produce a cryptographic signature for the data object, wherein the new name, the hash, and the cryptographic signature collectively represent the decoupled name for the data object;
responsive to receiving a request to access the data object, determining whether the decoupled name is associated with the data object;
when the decoupled name is associated with the data object, determining whether to return the decoupled name and the data object separately or together;
when the decoupled name is associated with the data object and when the determining is to return the decoupled name and the data object together, generating a new data object including the decoupled name embedded with the data object, and returning the new data object; and
when the decoupled name is associated with the data object and when the determining is not to return the decoupled name and the data object together, returning the decoupled name and the data object as separate objects using separate object names.

2. The method of claim 1, wherein the data object includes a Content Centric Networking (CCN) Content Object.

3. The method of claim 1, wherein the request to access the data object includes a network name for the content; and
the returning the content and the decoupled name further comprises:
selecting the data object based on the network name for the content; and
selecting the decoupled name based on the hash for the content.

4. The method of claim 3, wherein the returning at least the decoupled name and the content further involves:
generating a Manifest that includes the decoupled name; and
returning the Manifest.

5. The method of claim 3, wherein the data object request includes an Interest message which includes the network name or the new name for the data object.

6. The method of claim 1, wherein the data object is additionally bound to a name differing from the decoupled name.

7. The method of claim 1, wherein the request is received from a client.

8. The method of claim 1, wherein the encrypting the hash using the private key includes encrypting the hash using the private key, but not using the network name or the new name, to produce the cryptographic signature for the data object.

9. A non-transitory, computer-readable storage medium storing instructions that, when executed by a computer, cause the computer to perform a method, the method comprising:
responsive to receiving a command to generate a decoupled name for a data object having content and a network name, wherein the command includes a new name to bind to the data object:

generating a hash for the data object based on the content, but not based on either of the name or the new name;

obtaining a private key for signing the data object; and encrypting the hash using the private key to produce a cryptographic signature for the data object, wherein the new name, the hash, and the cryptographic signature collectively represent the decoupled name for the data object;

responsive to receiving a request to access the data object, determining whether the decoupled name is associated with the data object;

when the decoupled name is associated with the data object, determining whether to return the decoupled name and the data object separately or together;

when the decoupled name is associated with the data object and when the determining is to return the decoupled name and the data object together, generating a new data object including the decoupled name embedded with the data object, and returning the new data object; and when the decoupled name is associated with the data object and when the determining is not to return the decoupled name and the data object together, returning the decoupled name and the data object as separate objects using separate object names.

10. The storage medium of claim 9, wherein the data object includes a Content Centric Networking (CCN) Content Object.

11. The storage medium of claim 9, wherein the method further comprises:

receiving the request to access the data object, wherein the request includes a network name for the content;

selecting the data object based on the network name for the content; and selecting the decoupled name based on the hash for the content.

12. The storage medium of claim 11, wherein the returning involves:

generating a Manifest that includes the decoupled name; and returning the Manifest.

13. The storage medium of claim 11, wherein the data object request includes an Interest message which includes the network name or the new name for the data object.

14. The storage medium of claim 9, wherein the request is received from a client.

15. The storage medium of claim 9, wherein the encrypting the hash using the private key includes encrypting the hash using the private key, but not using the network name or the new name, to produce the cryptographic signature for the data object.

16. A computer system, comprising:

one or more processors; and a non-transitory computer-readable medium storing instructions that, when executed by the one or more processors, cause the computer system to perform a method including:

responsive to receiving a command to generate a decoupled name for a data object having content and a network name, wherein the command includes a new name to bind to the data object:

generating a hash for the data object based on the content, but not based on either of the name or the new name;

obtaining a private key for signing the data object; and encrypting the hash using the private key to produce a cryptographic signature for the data object, wherein the new name, the hash, and the cryptographic signature collectively represent the decoupled name for the data object;

responsive to receiving a request to access the data object, determining whether the decoupled name is associated with the data object;

when the decoupled name is associated with the data object, determining whether to return the decoupled name and the data object separately or together;

when the decoupled name is associated with the data object and when the determining is to return the decoupled name and the data object together, generating a new data object including the decoupled name embedded with the data object, and returning the new data object; and when the decoupled name is associated with the data object and when the determining is not to return the decoupled name and the data object together, returning the decoupled name and the data object as separate objects using separate object names.

17. The computer system of claim 16, wherein the request is received from a client.

18. The computer system of claim 16, wherein the encrypting the hash using the private key includes encrypting the hash using the private key, but not using the network name or the new name, to produce the cryptographic signature for the data object.

* * * * *